United States Patent [19]

Ogasawara et al.

[11] Patent Number: 4,773,270
[45] Date of Patent: Sep. 27, 1988

[54] PRESSURE GAGE

[75] Inventors: Yoshinari Ogasawara, Kasugai; Hideaki Matsunaga, Aichi, both of Japan

[73] Assignee: CKD Kabushiki Kaisha, Aichi, Japan

[21] Appl. No.: 17,626

[22] Filed: Feb. 24, 1987

[30] Foreign Application Priority Data

Apr. 7, 1986 [JP] Japan .................................. 61-79877

[51] Int. Cl.⁴ .............................................. G01L 7/04
[52] U.S. Cl. ...................................... 73/732; 116/296
[58] Field of Search .................. 73/384, 385, 386, 387, 73/732, 733, 734, 735, 736, 737, 738, 739, 740, 741, 742, 743, 709, 431, 711, 715, 716, 729, 731, 756; 116/296

[56] References Cited

U.S. PATENT DOCUMENTS 2,317,109  4/1943  Oxland ................................ 116/296
2,501,033  3/1950  Denison ............................... 116/296

Primary Examiner—Donald O. Woodiel
Attorney, Agent, or Firm—Robert E. Burns; Emmanuel J. Lobato

[57] ABSTRACT

A pressure gage for indicating pressure and variations thereof of a physical variable being monitored. The gage is provided with a circular dial having on the face thereof a pheripheral marginal portion or border green in color and graduations disposed internally of the green peripheral border. A pair of movable arcuate opaque cover plates, each made as an arc of an annulus, are disposed coaxial with the dial and graduations on the face of the dial. The plates are movably mounted for positioning thereof selectively in a circumferential direction of the dial for partially covering the marginal peripheral portion or border of the face of the dial. The plates are positionable selectively so that two opposed ends thereof define a space therebetween so that a green area of the border, which defines a range of selected pressure graduations on the dial, corresponds therewith. These two ends are colored red so that different ranges of pressure graduations may be selected to establish a range of normal values of pressures at which pressures the physical variable are in correspondence with a green normal zone or area of the dial. The graduations outside of the selected range remain visible and the pointer, also continuously visible, points to the instantaneous pressure value which may be in correspondence with the green area or the red areas designated by the plates.

6 Claims, 3 Drawing Sheets

_4,773,270_

PRESSURE GAGE

BACKGROUND OF THE INVENTION (a) Field of the Invention:

The present invention relates to a pressure gage permitting it to read a value on a disc-like dial as indicated by a pointer adapted to a be rotated around a center of the dial and thereby to determine a fluid pressure and, more particularly, to such a pressure gage being capable of accurately displaying a predetermined pressure range assuring a normal function of an apparatus which is subjected to a pressure of fluid such as air, water or oil.

(b) Description of the Prior Art:

To display a predetermined pressure range assuring a normal function of an apparatus which is subjected to a fluid pressure, the conventional pressure gage has usually been provided on the periphery of the dial with a single or two arrow-marking(s) adapted to indicate upper and lower critical values or any one of these critical values of the predetermined pressure range. With such a way of displaying, the marking has been so unnoticeable that it has often been difficult to determine whether the pressure value indicated by the pointer falls within the preset pressure range or not.

SUMMARY OF INVENTION

As a measure to solve the above-mentioned problem, the present invention provides a construction such that the dial is formed on its front surface with an indication hem extending along the outer periphery thereof and cover plates each in the form of circular arc are mounted on the dial in a circumferentialy position-adjustable manner for partially covering said indication hem, wherein the cover plates may be circumferentially displaced over the indication hem so as to cover the latter leaving a predetermined area exposed and thereby to display the predetermined pressure range by the exposed area of the indication hem extending along a portion of the periphery in the form of a circular arc. Thus, the preset range is displayed as a continuous circular arc which is easily visible and effectively facilitates it to determine whether the pressure value indicated by the pointer falls within the preset range or not.

BRIEF DESCRIPTION OF THE DRAWINGS

A specific embodiment of the present invention is illustrated by the accompanying drawing in which.

DESCRIPTION OF THE PREFERRED EMBODIMENT

Figure 1:
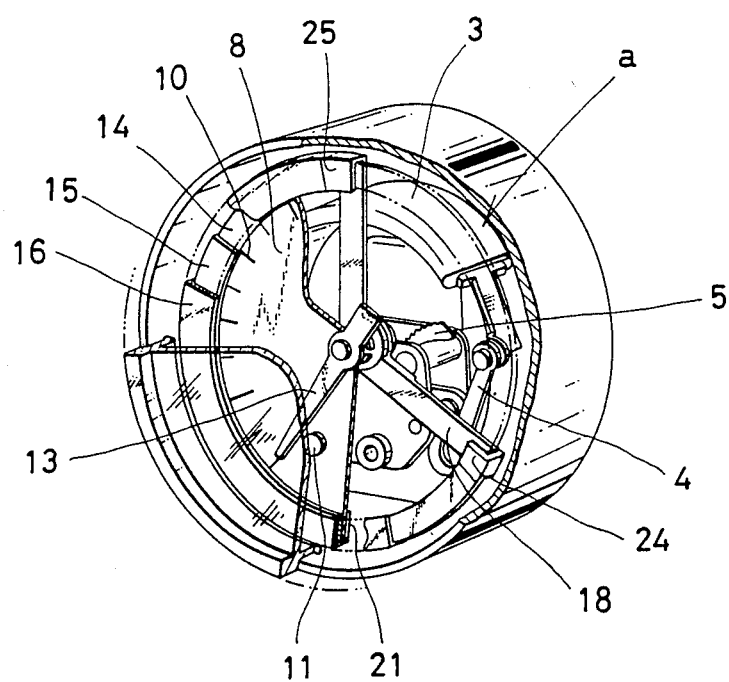
FIG. 1 is a partially broken perspective view of the embodiment.
Figure 2:
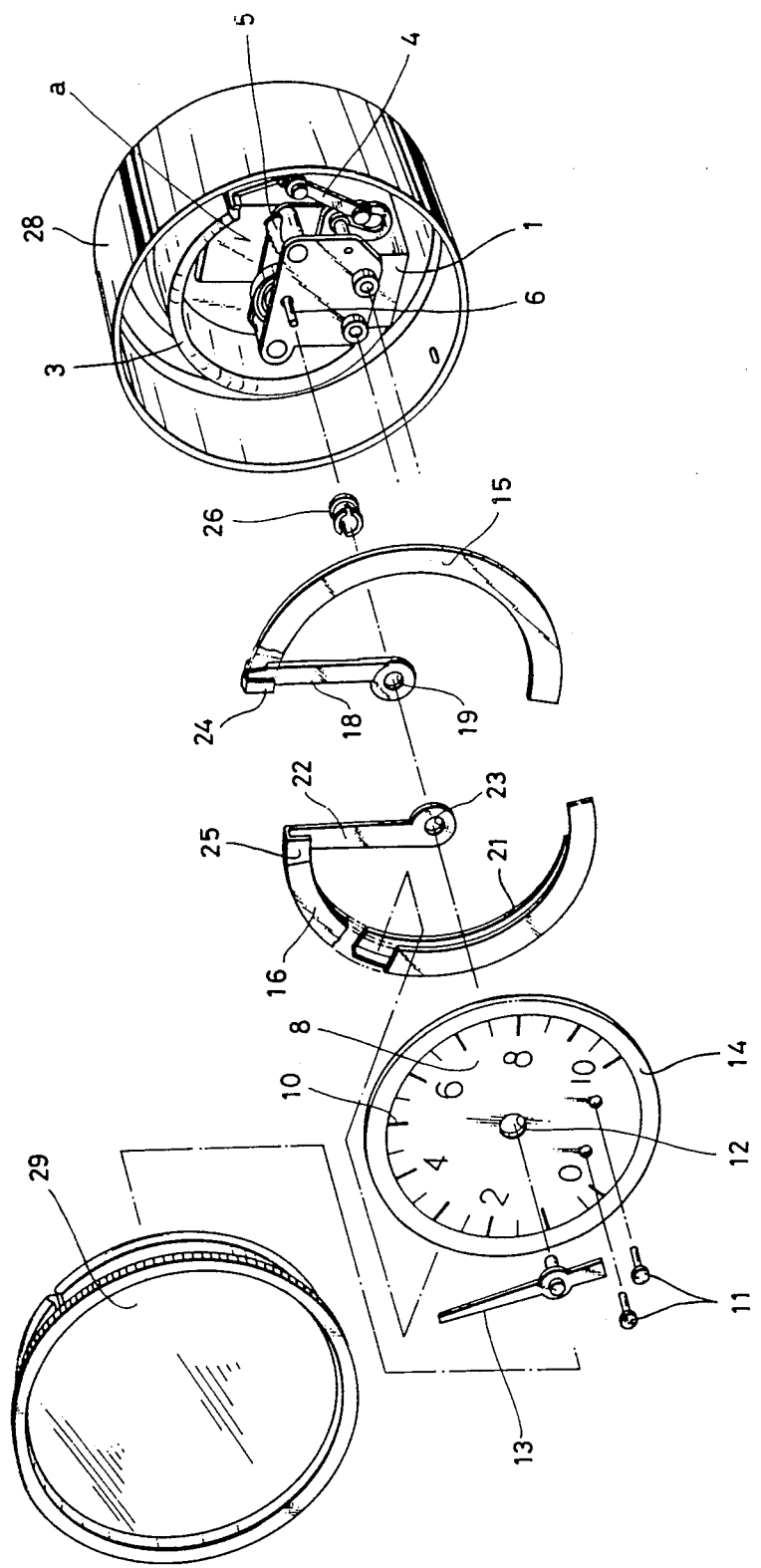
FIG. 2 is a perspective view illustrating the embodiment as disassembled.
Figure 3:
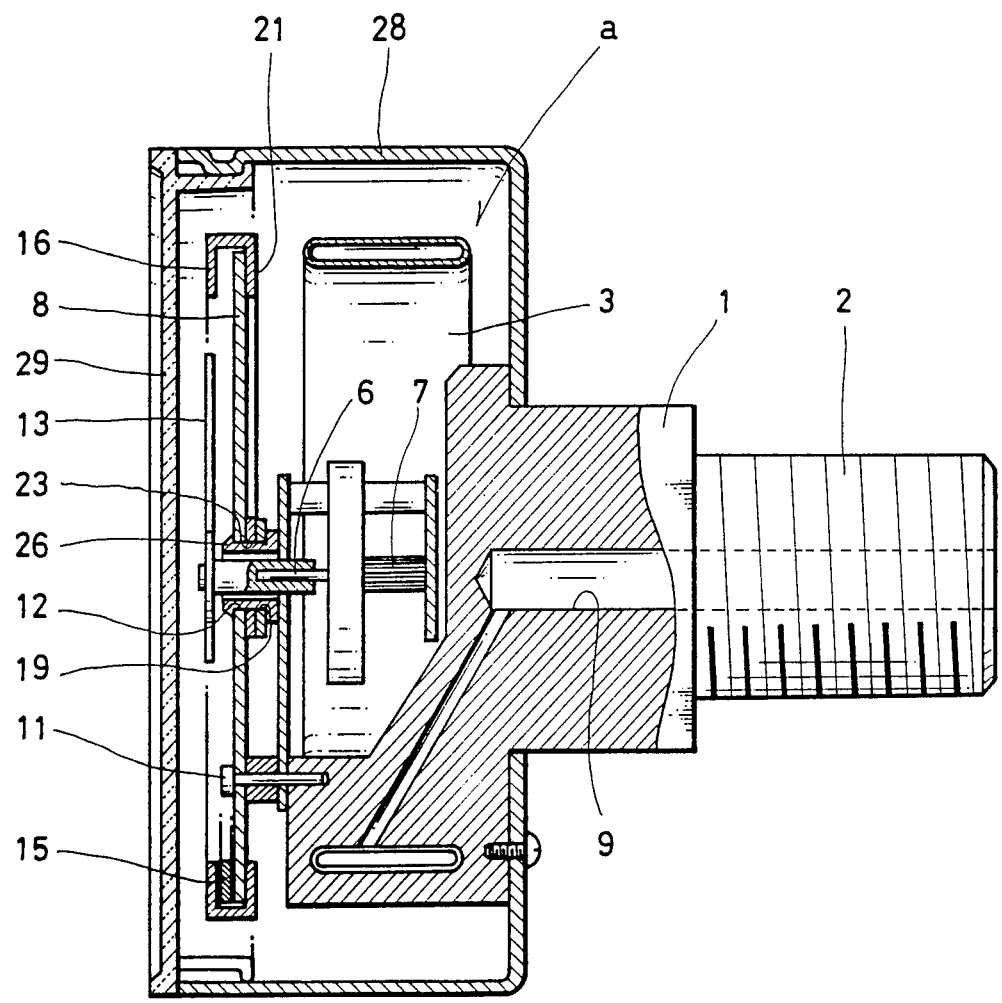
FIG. 3 is a sectional view of the embodiment.

The present invention will be more apparent from reading the following description of an embodiment, as applied to the Bourdon-tube pressure gage, given in reference with the accompanying drawing.

A pressure gage according to this embodiment essentially comprises a body 1 provided on its rear end with a male screw 2 projecting therefrom by which the pressure gage is mounted on an apparatus (not shown) being subjected to a pressure of fluid and actuator a carried by said body 1 to rotate an output shaft 6. This actuator a is so constructed that a pressure of the fluid introduced through a guide bore 9 formed in the body 1 into a Bourdon-tube 3 causes a deformation of the latter, said deformation causes, in turn, rotation of a sector gear 5 connected through a link 4 to a free end of said Bourdon-tube 3 and a pinion 7 adapted to be engaged with said sector gear 5, and thereby causes rotation of said output shaft 6 fixed to said pinion 7. The body 1 is provided on its front side with a circular dial 8 secured thereon by pins 11, 11 and said circular dial 8 carries on its front surface suitably calibrated graduations 10 circumferentially arranged slightly inside the outer periphery of the dial 8 itself. The output shaft 6 extending through a central hole 12 of the dial 8 carries on its front end a pointer 13 adapted to be rotated over the front surface of the dial 8 as the pressure of fluid varies and to indicate a particular graduation 10 corresponding to a current value of said pressure. A green-colored annular indication hem 14 surrounds the graduations 10 carried on the front surface of the dial 8 and a pair of cover plates 15, 16 in the form of semi-circular arcs are provided for partially covering the indication hem 14, respectively.

The cover plate 15 closely bears against the indication hem 14 and has a portion at its end as seen in a counterclockwise direction red-colored on the front surface thereof so as to define a limit indicating area 24. At this area 24 of the indication hem 14, an arm 18 integrally extending from the hem 14, striding over the periphery and along the rear surface of the dial 8, towards the center of the dial 8. A circular front end of the arm 18 is centrally formed with a mounting through-hole 19. The other cover plate 16 has a portion at its end as seen in a clockwise direction red-colored on the front surface thereof also to define a limit indicating area 25. The cover plate 16 further includes a support plate 21 in the form of semi-circular arc integral with or continuous from said cover plate 16 but spaced from the latter so that the dial 8 and said one cover plate 15 may be somewhat tightly received therebetween. Said support plate 21 strides over the periphery of the dial 8 and extends along the rear surface thereof. The support plate 21 is formed at its end as seen in clockwise direction with an arm 22 extending integrally therefrom towards the center of the dial 8. A circular front of this arm 22 is centrally formed with a mounting through-hole 23 in alignment with the mounting through-hole 19 formed through the arm 18 of said one cover plate 15 and these mounting through-holes 19, 23 are rotatably received around a bushing 26 tightly extending through the central hole 12 of the dial 8. The indication hem 14 of the dial 8 is partially covered by the cover plates 15, 16 with the end of the one cover plate 15 as seen in the clockwise direction being received between the other cover plate 16 and the dial 8 and, in this area, the cover plates 16, 15, the dial 8 and the support plate 21 closely bearing against one another in this order so that a frictional force developed among these components prevents the cover plates 15, 16 from being rotationally displaced relative to the dial 8 and a portion of the indication hem 14 defined between the limit indicating areas 24, 25 of the cover plates 15, 16, respectively, is exposed to be seen from the front.

The above-mentioned mechanism is enclosed by a cylindrical casing 28 secured to the body 1 and a transparent disc 29 is mounted in a front opening of said casing 28 covers the front surface of the dial 8.

In operation of the pressure gage according to the embodiment considered herein, when the cover plates 15, 16 are individually displaced in the circumferential direction with their corresponding ends being adjusted to the upper and lower limit values, respectively, of a predetermined pressure range previously set as the safety range, the safety range is indicated by a green-colored circular arc extending along a portion of the outer periphery of the graduations 10 while, at the opposite ends of said arc, the opposite borders of said safety range are indicated by the red-colored limit indicating areas 24, 25.

It should be understood that, if it is desired to avoid any circumferential displacement of the cover plates 15, 16 possibly occurring due to factors such as vibration, the dial 8 may be formed along its outer periphery with fine indentation while the cover plates 15, 16 also may be formed with correspondingly fine indentation adapted to be engaged with the indentation of the dial 8 and thereby to avoid said accidental displacement.

Furthermore, it should be understood that the present invention can find its application not only to the Bourdon-tube pressure gage but also to the pressure gage of any other type in which the graduations carried on the circular dial are pointed by the rotatable pointer.

What is claimed is:

1. A pressure gage for indicating pressure and variations thereof of a physical variable being monitored comprising, sensing means for sensing pressure and viariations thereof of said physical variable, indicating means responsive to the sensing means for indicating said pressure and the variations thereof, a dial coactive with the indicating means and having indicia thereon for indicating the pressure indicated by the pressure indicating means, the dial having on a face thereon said indicia disposed as a marginal peripheral border and as graduations internally of the border, for indicating pressure values, a pair of opaque cover plates partially covering the border and having colored ends and relatively movable independently relative to the dial border and said graduations for selectively positioning thereof in positions relative to the graduations which are never covered from view, said cover plates being positionable so that a space is defined between the colored opposed ends of the plates exposing an area of the border for viewing and to which said area a range of said graduations correspond, and means for movably mounting said plates to define selectively said space therebetween and relative to said graduations, whereby the cover plates are postionable to define between the colored ends thereof selectively preselected different individual ranges of normal pressure values on the gage dial to which said pressures are supposed to correspond.

2. A pressure gage for indicating pressure and variations thereof of a physical variable being monitored according to claim 1, in which said dial is circular, said dial having on the face thereof said marginal peripheral border of a given color, said plates having a color different than said color of the marginal pheripheral border of the dial, said graduations being disposed radially inwardly of and adjacent to said marginal peripheral border on the dial face, and said cover plates being disposed in registery with the marginal peripheral border.

3. A pressure gage for indicating pressure and variations thereof of a physical variable being monitored according to claim 2, in which said cover plates are each arcuate portions of an annulus coaxially mounted relative to each other and said graduations and are adjustably positionable in a circumferential direction relative to the dial.

4. A pressure gage for indicating pressure and variations thereof of a physical variable being monitored according to claim 3, in which said indicating means comprises a pointer mounted coaxial with said dial.

5. A pressure gage for indicating pressure and variations thereof of a physical variable being monitored according to claim 4, in which said sensing means comprises a Bourdon tube, said indicating means including gear means for coupling the Bourdon tube to said pointer.

6. A pressure gage for indicating pressure and variations thereof of a physical variable being monitored according to claim 2, in which said dial is discoidal, said dial having a green marginal peripheral border on the face thereof, said graduations being disposed close adjacent said green marginal peripheral border, said opaque cover plates each comprising arcuate sectors of an annulus and each having a red portion at said ends thereof defining said space to which said border area corresponds and in which a normal range of pressures is defined.

* * * * *